US012069423B1

(12) United States Patent
Choi et al.

(10) Patent No.: US 12,069,423 B1
(45) Date of Patent: Aug. 20, 2024

(54) HEAD-MOUNTED WEARABLE DEVICE WITH COMPACT TRANSDUCERS

(71) Applicant: AMAZON TECHNOLOGIES, INC., Seattle, WA (US)

(72) Inventors: Sangnam Choi, San Jose, CA (US); Chun Sik Jeong, San Jose, CA (US); Matthew Mark Robinson, Santa Clara, CA (US); Zhixin Chen, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/809,807

(22) Filed: Jun. 29, 2022

(51) Int. Cl.
*H04R 1/10* (2006.01)
*G02B 27/01* (2006.01)
*H04R 3/00* (2006.01)

(52) U.S. Cl.
CPC ....... *H04R 1/1075* (2013.01); *G02B 27/0176* (2013.01); *H04R 3/005* (2013.01); *G02B 2027/0178* (2013.01)

(58) Field of Classification Search
CPC .. H04R 1/1075; H04R 3/005; G02B 27/0176; G02B 2027/0178
See application file for complete search history.

(56) References Cited

U.S. PATENT DOCUMENTS

| | | | |
|---|---|---|---|
| 10,904,667 B1* | 1/2021 | Zhong | G02C 11/10 |
| 10,904,669 B1* | 1/2021 | Talakoub | H03G 3/32 |
| 11,526,034 B1* | 12/2022 | Pattikonda | G02C 11/10 |
| 2019/0238971 A1* | 8/2019 | Wakeland | H04R 1/24 |
| 2020/0304905 A1* | 9/2020 | Oishi | H04R 5/033 |
| 2021/0044882 A1* | 2/2021 | Jain | H04R 1/105 |
| 2022/0167077 A1* | 5/2022 | Mosgrove | H04R 1/1066 |

* cited by examiner

*Primary Examiner* — Andrew L Sniezek
(74) *Attorney, Agent, or Firm* — Lindauer Law, PLLC

(57) ABSTRACT

A head-mounted wearable device (HMWD) uses temples as housing for a transducer, maximizing the available space within the temples for other components, such as a battery. The exteriors of the temples act as housings so that separate transducer housings do not consume space within the temples. The temples may include openings that direct emitted sound toward the ear of a user of the HMWD. Sound generated by the transducer exits the openings and provides audio to the user's ear having a suitable volume. Each temple may include two microphones to facilitate use of a beamforming algorithm. When voice input is received, the HMWD may determine a particular set of microphones for use based on a charge level of power storage devices in each temple, a noise level associated with the microphones, or other factors.

23 Claims, 9 Drawing Sheets

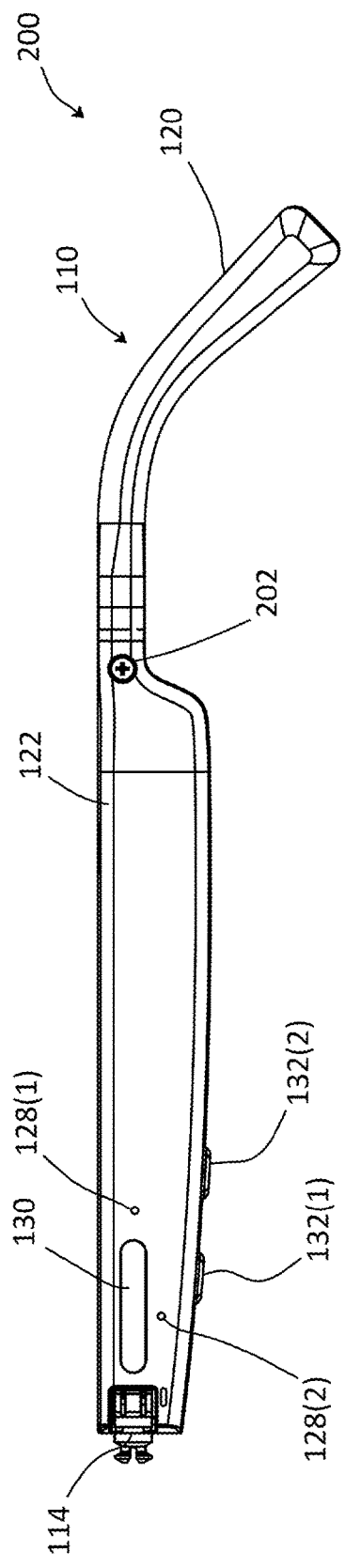
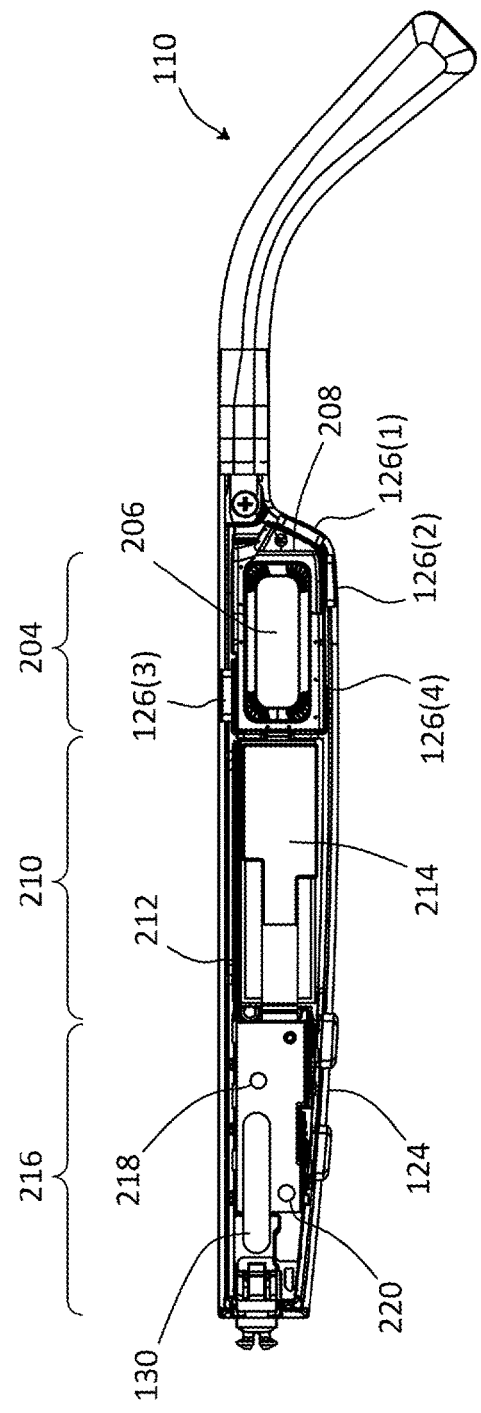
FIG. 2A
FIG. 2B (SECTION A-A)

HEAD-MOUNTED WEARABLE DEVICE WITH COMPACT TRANSDUCERS

BACKGROUND

Wearable computing devices may be used to provide a variety of functions. For example, a head-mounted wearable device (HMWD) may provide convenience when performing functions associated with audio input and audio output due to the proximity of the HMWD to the ears and mouth of a user when worn.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 2A and 2B are diagrams depicting a side view of a first temple of the head-mounted wearable device (HMWD) shown in FIGS. 1A and 1B, and a cut-away internal view of the first temple to depict internal components of the first temple.

Figure 1A:
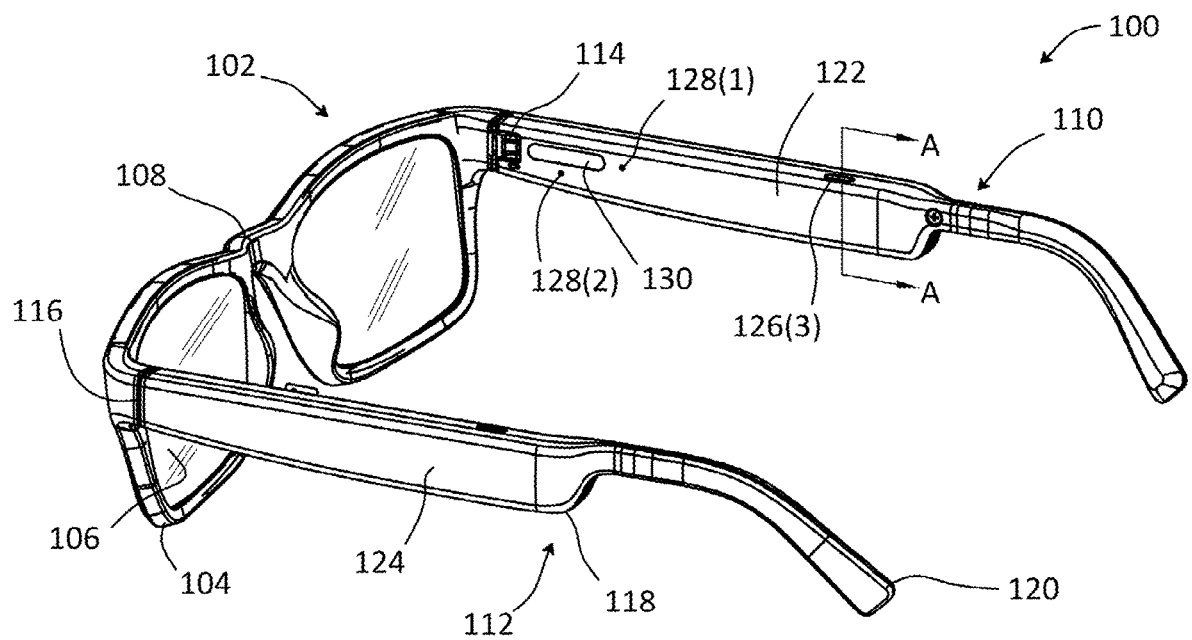
FIGS. 1A and 1B are diagrams depicting external perspective views of an implementation of a head-mounted wearable device (HMWD) within the present disclosure.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to coverall modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Portable computing devices may be used to provide a variety of functions to a user. For example, a wearable computing device may include various sensors, input devices, output devices, and so forth to enable a user to access data, provide input such as voice commands, receive output such as audio or display output, and so forth. Continuing the example, a wearable device may include a head-mounted wearable device (HMWD), which may have a form factor of glasses. In such a case, the HMWD may include a front frame with a nose bridge that contacts the nose of a user when worn, and temples that are movable relative to the front frame to support the HMWD on the ears of the user when the HMWD is worn, and to fold into a compact position when the HMWD is not worn. In some cases, the lenses or front frame may include visual output devices such as displays or light sources. The temples may include input and output devices such as microphones, speakers, buttons, and so forth. The temples may additionally include circuitry to process input or output, exchange data with other devices, and so forth. The temples may also include one or more power storage devices, such as rechargeable batteries.

The dimensions and weight of various components of an HMWD may affect the resulting size and weight of the device, which may impact the user experience associated with the HMWD. For example, if the microphones, speakers, circuitry, and other components of an HMWD occupy a large amount of volume within the temples or other portions of the device, the remaining volume for accommodating a power storage device may be limited, reducing the time that the HMWD is usable before recharging of the power storage device is necessary. Additionally, a large or heavy device may be unwieldy or uncomfortable for a user when worn or carried. Further, placement of circuitry or other components in movable portions of an HMWD or in portions that are prone to wear or impact, such as within the hinges or front frame of a device, may increase the potential for wear or damage and decrease the usable life of the HMWD.

Described in this disclosure is a head-mounted wearable device (HMWD) that includes transducers sealed within respective regions of the temples of the HMWD. Sealing transducers within the temples in this manner enables the exterior walls of the temples to function as a housing, eliminating the need for a separate housing for the transducers. Placement of the transducers in this manner may increase the available volume for other components, enable use of a larger battery or other type of power storage device, and so forth. Ports (e.g., openings) located on the portion of the temples that contains the transducer may be positioned to direct sound toward the ears of a user when the device is worn, without directing sound that may be overheard by other individuals. Each temple may include two or more microphones, enabling use of beamforming algorithms. For example, each microphone may be positioned on an inner side of the temple, at a position that is proximate to the front frame of the HMWD. When the microphones are used, a charge value for the power sources in each temple, or a detected noise value associated with the microphones, may be determined. The microphones associated with the temple having the larger charge value or the smaller noise value may be selected for use.

The temples may also include one or more light sources, such as light emitting diodes (LEDs) or other types of visible indicators, which may direct light inward, toward a user of the HMWD to facilitate visibility of the light. In some cases, a light source may be positioned remote from the front frame and a light pipe or other mechanism for conveying emitted light toward the front frame may be positioned between the light source and the front frame.

The HMWD includes a front frame that may contain lenses. The front frame includes a nose bridge to support the HMWD on the user's face. The temples of the HMWD are secured to opposite sides of the front frame using hinges that enable movement of the temples e between open and closed positions.

In some implementations, the front frame may lack circuitry, electronic components, computational components, and so forth. For example, the first temple and the second temple may each include processors, circuitry, and so forth, and the two temples may be placed in wireless communication using communication interfaces. Continuing the example, communication interfaces within the temples may wirelessly communicate using one or more Bluetooth protocols, or other types of wireless communication protocols. Use of a front frame that lacks electronic or computational components may reduce wear or damage to such components, and may also enable the front frame to be adjustable, or removable and replaceable, such as to modify the form factor of the HMWD, without affecting the electronic and computational components in the temples.

The first temple includes an internal volume in which a first transducer is placed. The first transducer includes a transducer body, which may be vibrated or otherwise actuated to produce sound, and a transducer bracket, which may be used to contact the external wall of the first temple to position the transducer body at a particular location within the first volume. The exterior wall of the first temple constitutes a single layer of material that separates the first transducer from an exterior of the HMWD, the exterior wall of the first temple functioning as a housing for the first transducer. The transducer body separates the internal volume into two portions. A first portion of the volume is positioned on the inner side of the temple. One or more openings within the exterior wall of the temple allow air, and thus sound, to pass between the first portion of the volume and the exterior of the temple. These openings may be positioned at a location on the temple that is proximate to the ear of a user when the HMWD is worn. A second portion of the volume is positioned on the outer side of the temple. One or more openings within the exterior wall of the temple allow air to pass between the second portion of the volume and the exterior of the temple. Openings between the second portion of the volume and the exterior may be oriented generally vertically, such as in the top side and underside of the temple.

The volume within the first temple that contains the transducer may be separated from other internal volumes within the first temple by an airtight barrier. For example, in the first temple may be assembled by placing inner and outer housing portions together, enclosing the transducer within the internal volume. The two portions of the housing may be sealed together using glue, or another type of bonding agent, adhesive, or sealant. In some implementations, one or both portions of the housing may have a protruding portion that engages a recessed portion of the other portion of the housing, such as a tongue-in-groove engagement. The glue or other type of bonding agent may be provided into the space between the protruding and recessed portions of the housing portions. In some cases, the space where the glue is applied may include an enlarged region to prevent adhesive from entering the volume occupied by the transducer, which may reduce damage to components if excess adhesive is used. Sealing of the transducer within the temple in this manner may provide airtight barriers between the transducer and other volumes within the temple, such that ports formed in the exterior wall of the temple constitute the only communication between the transducer and the exterior of the HMWD. After sealing of the transducer in this manner, the first internal volume may be pressurized using a gas to test the sealing of the volume.

In some implementations, the exterior wall of the first temple may include four openings that enable the passage of air between the exterior of the temple and portions of the internal volume that contain the transducer. As described previously, the transducer divides the internal volume into a first portion that is on the inner side of the temple, and a second portion that is on the outer side of the temple. in some implementations, two openings may extend through the exterior wall of the temple to allow the passage of air between the first portion of the volume and the exterior of the temple. The two openings may be formed at positions that are proximate to an ear of a user when the HMWD is worn. In some cases, the openings may each be positioned at a different angle relative to the transducer. For example, a first opening may be positioned generally perpendicular to the transducer, such as at an angle that may enable sound from the transducer to be emitted laterally along the axis of the first temple, while the second opening is angled vertically downward relative to the first opening to emit sound toward the distal end of the temple and vertically downward. Two other openings may extend through the exterior wall of the temple to allow the passage of air between the second portion of the internal volume and the exterior of the temple. For example, a third opening may be formed in the top wall of the temple. A fourth opening may be formed a in the bottom wall of the temple. Inclusion of the third and fourth openings may improve the quality of sound emitted through the first and second openings toward the ear of the user. Vertical orientation of the third and fourth openings may emit sound in directions that are unlikely to be overheard by other individuals. In some implementations, the fourth opening may have a diameter smaller than that of the other openings to affect the resonance or other characteristics of audio emitted from the transducer. A layer of acoustic material, such as acoustic mesh, may be positioned over each of the openings. In some implementations, the layer of material positioned over each opening may have generally the same thickness.

In other implementations, other configurations of openings may be used. For example, a single opening that allows air to travel between the first portion of the volume and the exterior of the temple may be used. In some cases, the single opening may extend across a curved portion of the exterior wall of the temple. For example, the single opening may have two portions that are angled relative to one another. In still other implementations, a single opening may allow air to travel between the second portion of the volume and the exterior of the temple. The diameters of each opening and the thickness or other material characteristics of material positioned over the openings may be selected to provide sound from the transducer with desired resonance, volume, and other characteristics.

The second temple of the HMWD may similarly contain a second transducer, and may be of the same or similar construction as that described previously with regard to the first temple and first transducer. The arrangement of openings on the second temple may be identical or similar to the arrangements of openings described with regard to the first temple. In other implementations, only a single temple of the HMWD may include a transducer.

In some implementations, a first set of two or more microphones may be included in the first temple, and a second set of two or more microphones may be included in the second temple. For example, two microphones may be positioned within an internal volume within a temple that is separate from the internal volume that contains the transducer. Each microphone may be positioned on the inner side of the temple, at a location that is proximate to the front frame of the HMWD. Use of two microphones in a temple may enable audio data acquired by both microphones to be processed using a beamforming algorithm. Use of different microphones contained in different temples of the HMWD, may enable a particular microphone to be selected for use based on various conditions. In some implementations, each temple may contain a power storage device, such as a rechargeable battery, and a charge value for each power storage device may be determined. The microphone(s) associated with the power storage device having the larger charge value may be selected for use. In other implementations, one or more microphones may be used to acquire audio data, and the acquired audio data may be used to determine a noise value. In such a case, the microphone(s) associated with the lower noise value may be selected for use.

Figure 1B:
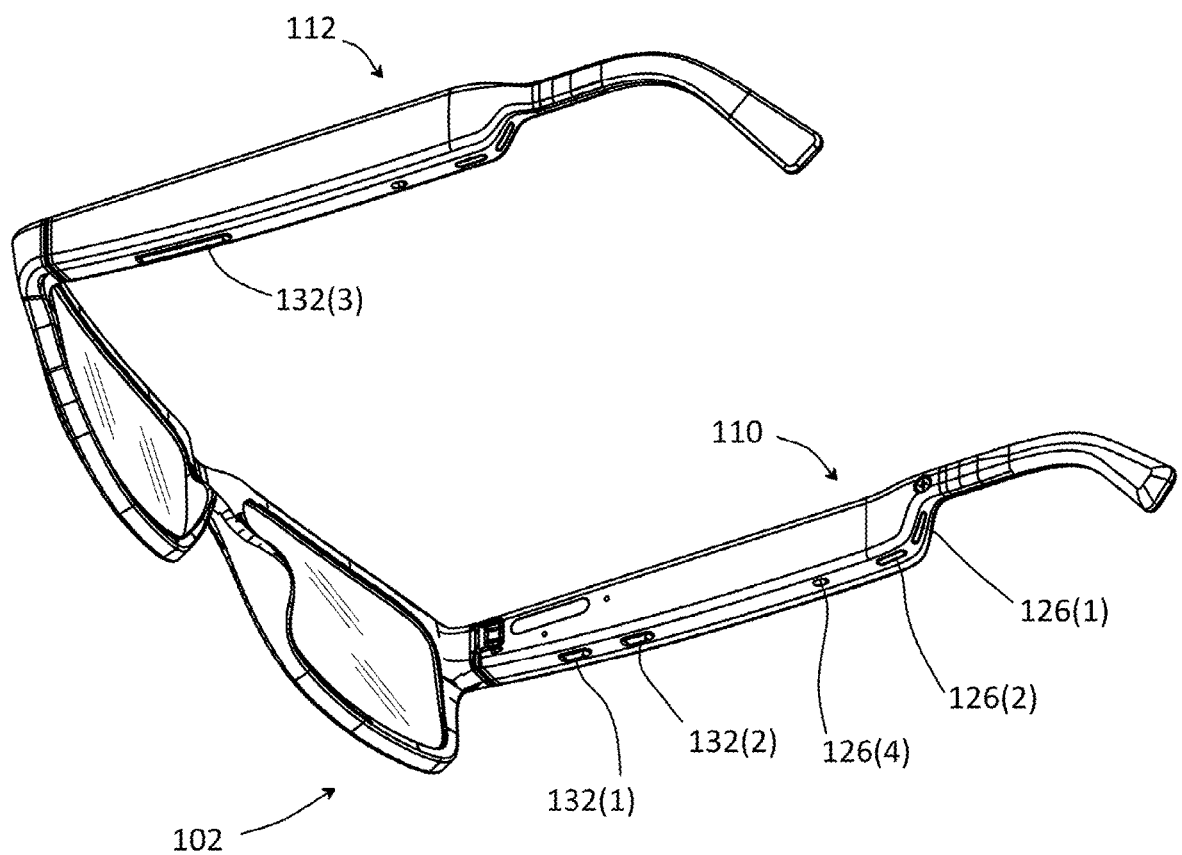

FIGS. 1A and 1B are diagrams 100 depicting external perspective views of an implementation of a head-mounted wearable device (HMWD) 102 within the present disclosure. As shown in FIGS. 1A and 1B, an HMWD 102 may have a form factor of glasses. The HMWD 102 may include a front frame 104 that includes a left side and a right side, each side of the front frame 104 enclosing a lens 106. In other implementations, the HMWD 102 may exclude lenses 106. A first side of the front frame 104 that encloses a first lens 106 and a second side of the front frame 104 that encloses a second lens 106 may be connected by a nose bridge 108. The nose bridge 108 may contact and be supported by the nose of a user during use of the HMWD 102. For example, the nose bridge 108 may have a curved shape complementary to the shape of a human nose for placement around the nose of the user when the HMWD 102 is worn. In some implementations, the front frame 104 may be adjustable or removable and replaceable. For example, adjustment or replacement of the front frame 104 may enable a user to provide the HMWD 102 with different aesthetic or functional form factors.

The HMWD 102 may include a first temple 110 attached to the first side of the front frame 104 and a second temple 112 attached to the second side of the front frame 104. In some implementations, the temples may be movable relative to the front frame 104. For example, the first temple 110 may be attached to the front frame 104 using a first hinge 114, and the second temple 112 may be attached to the front frame 104 using a second hinge 116. The hinges may enable the temples to be movable between an open position, as shown in FIGS. 1A and 1B, at which the temples are positioned generally perpendicular to the front frame 104 for placement over the ears of a user when the HMWD 102 is worn, and a closed position at which the temples may be folded proximate to the front frame 104.

The first temple 110 and second temple 112 may include various types of circuitry, computational components, input devices, output devices, and so forth. As described previously, in some implementations, the front frame 104 may lack such circuitry, electrical components, or computational components. Excluding such components from the front frame 104 may reduce damage or wear to the components, and may enable the front frame 104 to be adjusted or removed and replaced without affecting the circuitry or computational components within the temples. In such a case, each temple may include a communication interface to enable data, signals, commands, or other information to be exchanged between the first temple 110 and second temple 112 using wireless communication, without requiring an electrical connection across the front frame 104. The components within one or both of the temples may include input devices such as buttons or microphones, output devices such as speakers, light sources, haptic components, display devices, processors and memory or other types of circuitry for processing input and output, wireless communication components, and so forth. Additionally, one or both of the temples may include a power source, such as a rechargeable battery, for providing electrical power to components of the HMWD 102.

Specifically, FIGS. 1A and 1B depict each temple including a temple body 118 and an earpiece 120. The temple body 118 may contain circuitry, electrical and computational components, input and output devices, and so forth, within an interior thereof, while the earpiece 120 may be used to support the HMWD 102 on an ear of a user when the HMWD 102 is worn. In some implementations, the earpiece 120 may be adjustable. For example, an earpiece 120 may be pivotable or bendable, which may enable the earpiece 120 to be positioned in a generally straight orientation that extends parallel to the temple body 118, or in a curved or angled orientation for placement over and at least partially behind an ear of a user. The temple body 118 may include an inner housing 122 and an outer housing 124 that are engaged with one another. For example, the inner housing 122 and outer housing 124 may include one or more recesses that become enclosed interior volumes within the temple body 118 when the inner housing 122 and outer housing 124 are engaged. Continuing the example, the inner housing 122 and outer housing 124 may be engaged to one another using one or more of a mechanical interference fit, mechanical fasteners, adhesive, welding, and so forth. The interior volumes within the temple body 118 may contain various circuitry, electrical components, computational components, input devices, output devices, and so forth.

For example, a first transducer may be enclosed within a first volume of the first temple 110, proximate to the earpiece 120 thereof. The first transducer may be sealed in the first volume, such as by providing one or more airtight barriers between the first volume and one or more other volumes within the first temple 110. The first transducer may lack a separate housing, and the exterior wall of the first temple 110 may function as the housing of the first transducer such that the first transducer has a single layer of material (e.g., the exterior wall of the first temple 110) that separates the first transducer from the environment external to the HMWD 102. One or more transducer openings 126 may be formed in the exterior of the first temple 110. The transducer openings 126 may allow the passage of air between the exterior of the first temple 110 and the interior volume in the first temple 110 that contains the first transducer. Sound from the first transducer may therefore be emitted through the transducer openings 126. Because the first transducer is sealed within the first volume, the transducer openings 126 may be the only features that enable air to flow between the interior volume that contains the first transducer and the environment external to the HMWD 102.

The first transducer may divide the interior volume within which the first transducer is placed into a first portion that faces the inner housing 122 of the first temple 110 and a second portion that faces the outer housing 124 of the first temple 110. A first transducer opening 126(1) and a second transducer opening 126(2) are shown formed in the first temple 110 on an underside thereof, proximate to the earpiece 120. As shown in FIG. 1B, the first transducer opening 126(1) may be positioned at a first angle relative to the first transducer within the first temple 110, and the second transducer opening 126(2) may be positioned at a second angle relative to the first transducer that differs from the first angle. The position of the first transducer opening 126(1) and second transducer opening 126(2) on the underside of the first temple 110 proximate to the earpiece may cause the first transducer opening 126(1) and second transducer opening 126(2) to be positioned proximate to an ear of a user when the HMWD 102 is worn, which may facilitate the audibility of sound from the first transducer to the user. The first transducer opening 126(1) and second transducer opening 126(2) may enable the passage of air between the exterior of the first temple 110 and the first portion of the volume in which the first transducer is contained (e.g., the portion of the first volume that is adjacent to the inner housing 122).

A third transducer opening 126(3) is shown formed in the first temple 110 on an upper side thereof (when the HMWD 102 is an orientation associated with normal wear by a user), farther from the earpiece 120 and closer to the front frame 104 than the first transducer opening 126(1) and second transducer opening 126(2). A fourth transducer opening 126(4) is shown formed in the first temple 110 on a lower side thereof, generally opposite the position of the third transducer opening 126(3). The third transducer opening 126(3) and fourth transducer opening 126(4) may enable passage of air between the exterior of the first temple 110 and the second portion of the volume in which the first transducer is contained (e.g., the portion of the first volume that is adjacent to the outer housing 124). Inclusion of the third transducer opening 126(3) and fourth transducer opening 126(4) may improve the quality of sound emitted through the first transducer opening 126(1) and second transducer opening 126(2). The position of the third transducer opening 126(3) and fourth transducer opening 126(4) to emit sound in generally vertical directions when the HMWD 102 is worn may reduce the potential for sound emitted through the third transducer opening 126(3) and fourth transducer opening 126(4) to interfere with sound emitted through the first transducer opening 126(1) and second transducer opening 126(2), and for sound emitted through the third transducer opening 126(3) and fourth transducer opening 126(4) to be overheard by other individuals not wearing the HMWD 102. As shown in FIGS. 1A and 1B, in some implementations, the first transducer opening 126(1), second transducer opening 126(2), and third transducer opening 126(3) may have a first diameter, while the fourth transducer opening 126(4) may have a second diameter that is smaller than the first diameter. In other implementations, the third transducer opening 126(3) may have a smaller diameter while the diameter of the fourth transducer opening 126(4) is equal to that of the first transducer opening 126(1) and second transducer opening 126(2).

A second transducer may be enclosed within an interior volume of the second temple 112 proximate to the earpiece 120 thereof, in a location that corresponds to the location of the first transducer within the first temple 110. Similarly, the second temple 112 may have transducer openings 126 formed therein that correspond to the locations of the transducer openings 126 described with regard to the first temple 110. In other implementations, each temple of the HMWD 102 may include a different number or arrangement of transducer openings 126.

Other components within the temples of the HMWD 102 may include one or more microphones. For example, FIG. 1A illustrates an implementation in which two microphones are included within the first temple 110. As shown in FIG. 1A, a first microphone opening 128(1) may be formed in the exterior of the first temple 110 to facilitate transmission of sound from a user into the interior of the first temple 110 where a first microphone is located. A second microphone opening 128(2) may be formed in the exterior of the first temple 110 to facilitate transmission of sound to a location where a second microphone is positioned. The microphone openings 128 may be formed in the inner housing 122 of the first temple 110, such that the microphone openings 128 are positioned on an inner side of the first temple 110 that faces a user when the HMWD 102 is worn. The microphone openings 128 may be positioned proximate to the front frame 104. This placement of the microphone openings 128 may facilitate acquisition of sound from a user, while limiting wind nose and other sound from the ambient environment that is acquired by the microphones. Use of two microphones within the first temple 110 may enable a beamforming algorithm to be used to process audio data acquired using both of the microphones and determine modified audio data. The modified audio data may then be used for determining voice input from the user, for communication such as during a voice call with another party, and so forth.

The beamforming algorithm manipulates two or more instances of acquired audio data, each acquired by a microphone located at a different spatial position with respect to the temple, to generate modified audio data. The beamforming algorithm may operate on the audio data using one or more functions such as summing, applying scaling factors, applying phase shifts, and so forth. By utilizing the functions, a beamforming algorithm may be used to provide spatial selectivity in which gain is directed towards a particular location in space such as where the user's mouth is, away from a noise source, and so forth. For example, a beamforming algorithm may apply specific phase shifts to audio data acquired by particular ones of the microphones, producing an effective gain pattern in which the amplitude of audio from a location in space where the user's mouth is expected to be during operation is increased. This may improve the quality of acquired audio, reduce noise in the acquired audio, and so forth. In some cases, times when data indicative of particular sounds are acquired may be used to determine locations of the sources of the sounds, and use of multiple microphones to acquire such data may improve the accuracy of the determined locations.

In some implementations, the second temple 112 may similarly include one or more microphones and microphone openings 128 formed in positions on the exterior of the second temple 112 that correspond to the positions of the microphone openings 128 in the first temple 110. Inclusion of a second set of microphones on the second temple 112 may enable selective use of particular microphones based on various circumstances. In one implementation, a charge value associated with a power storage device (e.g., a battery) in each temple may be determined, and the microphone(s)

associated with the power storage device having the larger charge value may be selected for use. In another implementation, one or more of the microphones may be used to acquire audio data indicative of noise, a noise value for I microphones may be determined, and the microphone(s) associated with the lower noise value may be selected for use.

One or more light sources 130 may also be included in one or more of the temples. For example, FIG. 1A depicts a light source 130 within the first temple 110, positioned on the inner housing 122 thereof proximate to the first hinge 114. For example, the light source 130 may include one or more LEDs. Positioning the light source 130 on an inner side of the first temple 110 and proximate to the first hinge 114 may facilitate visibility of light emitted by the light source 130 to a user of the HMWD 102, while the structure of the HMWD 102 may at least partially occlude emitted light from other individuals. Light from the light source 130 may be directed inward, toward a user of the HMWD 102 to facilitate visibility. In some implementations, the light source 130 may be located within the first temple 110 and a light pipe may be used to direct the emitted light to an area on an exterior of the inner housing 122. While FIG. 1A depicts a single light source 130 associated with the first temple 110, in other implementations, one or more light sources 130 may also be included on the second temple 112.

The first temple 110 and second temple 112 may also include one or more other input devices, such as one or more buttons 132. Buttons 132 may be used to control one or more microphones, such as to indicate times when a user intends to utter a voice command, to control one or more transducers, such as by adjusting volume or other characteristics of emitted sound, to control one or more light sources 130, to cause processors or circuitry within the temples to perform various functions, and so forth. Different configurations of buttons 132 may be present on each temple. For example, FIG. 1B depicts a first button 132(1) proximate to a second button 132(2) on an underside of the first temple 110 (when the first temple is in an orientation for normal wear by a user), proximate to the front frame 104. On the second temple 112, FIG. 1B depicts a single elongated button 132(3) on the underside thereof.

FIGS. 2A and 2B are diagrams 200 depicting a side view of a first temple 110 of the head-mounted wearable device (HMWD) 102 shown in FIGS. 1A and 1B, and a cut-away internal view of the first temple 110 to depict internal components of the first temple 110. As shown in FIG. 2A and described with regard to FIGS. 1A-1B, the temple body 118 of the first temple 110 may have a first hinge 114 at a first end for engagement with the front frame 104, and a connector 202 at a second end for engagement with the earpiece 120. The inner housing 122 may include one or more microphone openings 128 to facilitate passage of sound from an environment external to the first temple 110 to one or more microphones within the first temple 110. The inner housing 122 may also include a light source 130 proximate to the first hinge 114, which may direct emitted light toward the inner housing 122. One or more buttons 132 may also be accessible on the first temple 110, such as positioned on an underside thereof.

As shown in FIG. 2B, the interior of the first temple 110 may include a first volume 204 in which a transducer is positioned to emit sound through one or more transducer openings 126 formed in the exterior wall of the first temple 110 around the transducer. The transducer may include a transducer body 206, which may include a diaphragm or other structure configured to vibrate, manipulate air, or otherwise be actuated to generate sound, and a transducer bracket 208, which may be used to position the transducer body 206 within the first volume 204. For example, the transducer bracket 208 may be used to provide a spacing or offset between the interior wall of the first temple 110 and the transducer body 206. As described with regard to FIGS. 1A and 1B, the first volume 204 within which the transducer is placed may be sealed from one or more other volumes within the first temple 110, such as through use of one or more airtight barriers. For example, glue or another bonding agent, adhesive, or sealant may be used to engage the inner housing 122 and outer housing 124 of the first temple 110, which may seal the first volume 204 from an adjacent second volume 210 within the first temple 110. The transducer body 206 may separate the first volume 204 into a first portion on a first side of the transducer body 206 and a second portion on the opposite side of the transducer body 206. One or more transducer openings 126 formed in the exterior wall of the first temple 110 may enable sound emitted using the transducer to pass into the environment external to the HMWD 102. A first transducer opening 126(1) and second transducer opening 126(2) positioned near the earpiece 120 may enable passage of air between the first portion of the first volume 204 and the exterior of the first temple 110, and may be oriented to emit sound toward an ear of a user when the HMWD 102 is worn. A third transducer opening 126(3) and fourth transducer opening 126(4) may enable passage of air between the second portion of the first volume 204 and the exterior of the first temple 110, and may be oriented to emit sound in generally vertical directions when the HMWD 102 is worn.

The second volume 210 within the interior of the first temple 110 may contain a power storage device 212, such as a rechargeable battery, circuitry for controlling various functions of the HMWD 102, and as shown in FIG. 2B, a capacitive sensor 214 that may receive touch input from a user, detect placement of the first temple 110 on the head of the user, and so forth. Circuitry within the first temple 110 may include one or more processors, memories, systems on a chip (SoC), and so forth that may be used to receive input from the capacitive sensor 214, microphones, buttons, and other sensors, commands, data, signals, or other types of information. The first temple 110 may also include a communication interface within the second volume 210 or another portion of the first temple 110 that may be used to communicate with a communication interface within the second temple 112. The communication interface may also be used to exchange data with other computing devices, such as by connecting to one or more wireless networks. Circuitry within the first temple 110 may also be used to execute various applications stored on the HMWD 102 or in another device accessible to the communication interface, to control the transducer, determine a status or charging process of the power storage device 212, the light source 130, one or more microphones, determine actuation of one or more buttons 132, and so forth.

A third volume 216 within the first temple 110 may contain the light source 130, and in some cases one or more components to channel emitted light, such as one or more light pipes. The third volume 216 may also contain a first microphone 218, which may be generally aligned with the first microphone opening 128(1) in the exterior wall of the first temple 110, and a second microphone 220, which may be generally aligned with the second microphone opening 128(2).

FIG. 2B depicts an example arrangement in which one or more microphones are positioned in the third volume 216 proximate to the first hinge 114, the transducer is positioned in the first volume 204 proximate to the earpiece 120, and the power storage device 212 and capacitive sensor 214 are positioned in the second volume 210. Positioning of components within the first temple 110 in the manner shown in FIG. 2B may enable electrical communication between circuitry in the second volume 210 and the components in each of the first volume 204 and third volume 216. However, in other implementations, other arrangements of components within the interior of the first temple 110 may be used. For example, a temple may include only two internal volumes, or more than three volumes. Additionally, while FIGS. 2A and 2B depict an example implementation of the first temple 110, the second temple 112 of the HMWD 102 may include identical or similar components.

Figure 3:
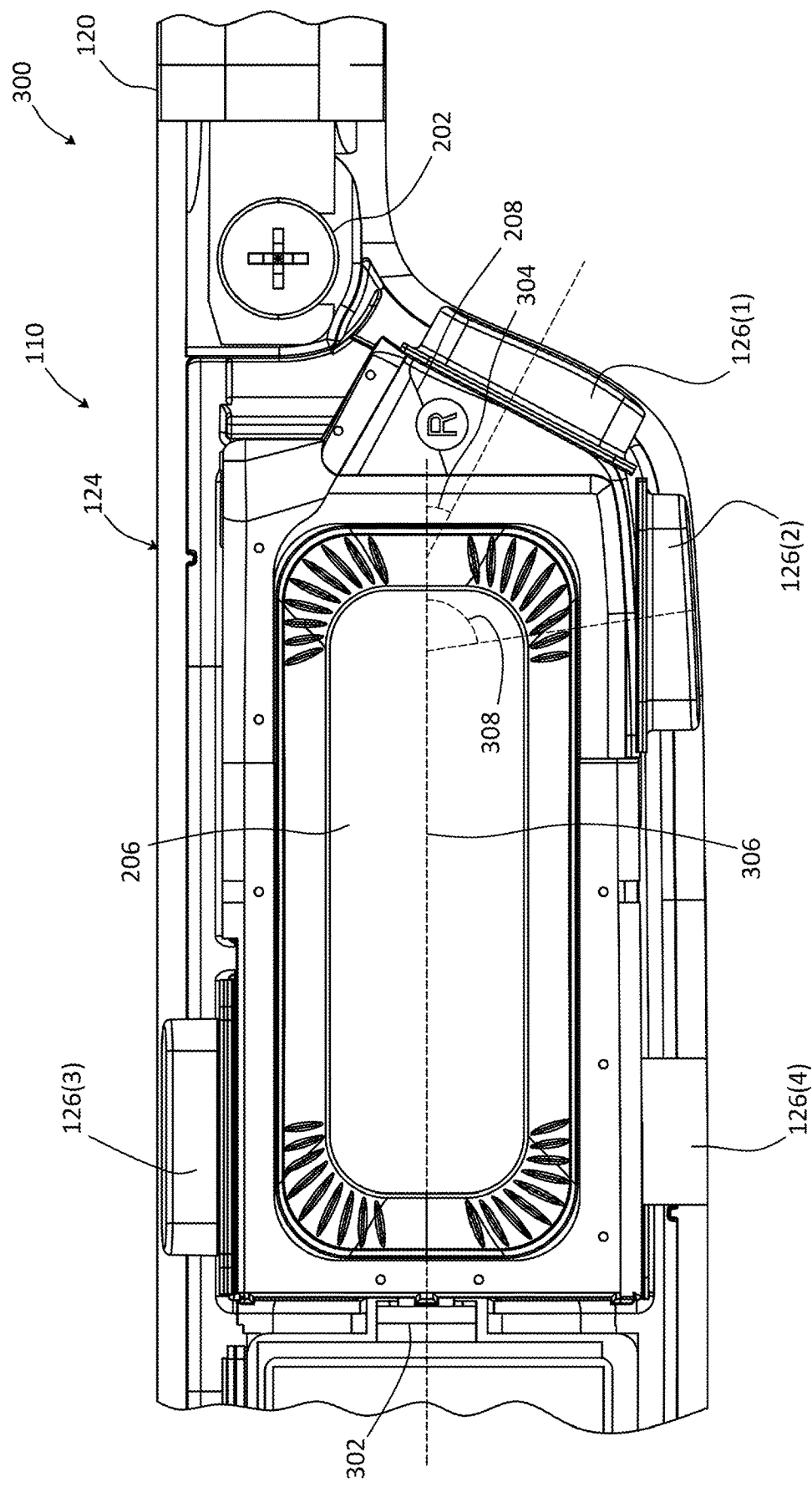
FIG. 3 is a diagram depicting a cut-away internal view of a portion of the first temple of the head-mounted wearable device (HMWD) of FIGS. 1A and 1B, showing the internal components of the first temple associated with a transducer.

FIG. 3 is a diagram 300 depicting a cut-away internal view of a portion of the first temple 110 of the head-mounted wearable device (HMWD) 102 of FIGS. 1A and 1B, showing the internal components of the first temple 110 associated with a transducer. As described with regard to FIG. 2B, a first volume 204 within the first temple 110 may enclose a transducer. The transducer may include a transducer body 206 that may be used to cause sound to be emitted through one or more transducer openings 126, and a transducer bracket 208 that may be used to position the transducer body 206 within the first volume 204. For example, the outer housing 124 of the first temple 110 may include a recessed region that, when engaged with a similar recessed region in the inner housing 122, forms a first volume 204 that encloses the transducer. The first volume 204 may be isolated from an adjacent volume within the first temple using glue or another type of airtight barrier. For example, a second volume 210 adjacent to the first volume 204 may enclose a power storage device 212, capacitive sensor 214, circuitry, and other components. One or more electrical conductors 302 may engage the transducer with circuitry in the first temple 110 to enable the transducer to be controlled using signals or other types of data.

For example, based on data received by one or more components of the circuitry of the first temple 110, the transducer may be actuated to cause sound having a selected volume, frequency, directionality, or other selected characteristics to be emitted through one or more transducer openings 126. As described with regard to FIGS. 1 and 2, the transducer body 206 may separate the first volume 204 into a first portion on a first side of the transducer body 206, and a second portion on a second side of the transducer body 206 that is isolated from the first portion. The first transducer opening 126(1) and the second transducer opening 126(2) may enable the passage of air between the exterior of the first temple 110 and the first portion of the first volume 204. The first transducer opening 126(1) and second transducer opening 126(2) may be positioned on a portion of the first temple 110 proximate to the earpiece 120. Sound emitted through the first transducer opening 126(1) and second transducer opening 126(2) may therefore be emitted proximate to an ear of a user when the HMWD 102 is worn.

The first transducer opening 126(1) and second transducer opening 126(2) may be positioned at different angles relative to the transducer. For example, FIG. 3 depicts the first transducer opening 126(1) positioned at a first angle 304 relative to a centerline of a long axis 306 of the transducer. The second transducer opening 126(2) is shown positioned at a second angle 308 relative to the long axis 306 of the transducer that differs from the first angle 304. In other implementations, the first transducer opening 126(1) and second transducer opening 126(2) may constitute a single opening. For example, while FIG. 3 depicts the first transducer opening 126(1) and second transducer opening 126(2) spaced apart with a section of the exterior wall of the first temple 110 between the openings, a single opening may span across this section of the exterior wall. For example, a single opening may have a curved or angled shape with a first portion at the first angle 304 relative to the long axis 306 of the transducer and a second portion at the second angle 308 relative to long axis 306 of the transducer. Continuing the example, the first temple 110 may have a curved portion on a lower side thereof, proximate to the earpiece 120, as show in FIGS. 1-3. A single opening having a curved or angled shape may span this curved portion of the first temple 110. FIG. 3 also depicts the third transducer opening 126(3) positioned on the upper side of the first temple 110 to emit sound in a vertical direction upward when the HMWD 102 is worn, and the fourth transducer opening 126(4) on the lower side of the first temple 110 to emit sound in a vertical direction downward when the HMWD 102 is worn. The third transducer opening 126(3) and fourth transducer opening 126(4) may permit the passage of air between the exterior of the first temple 110 and the second portion of the first volume 204. In some implementations, one or more of the third transducer opening 126(3) or fourth transducer opening 126(4) may have a diameter smaller than that of one or more of the other transducer openings 126. Each of the transducer openings 126 may be covered by a layer of acoustic material, such as acoustic mesh. In some implementations, the layer of acoustic material that covers each transducer opening 126 may have the same or a similar thickness.

Figure 4:
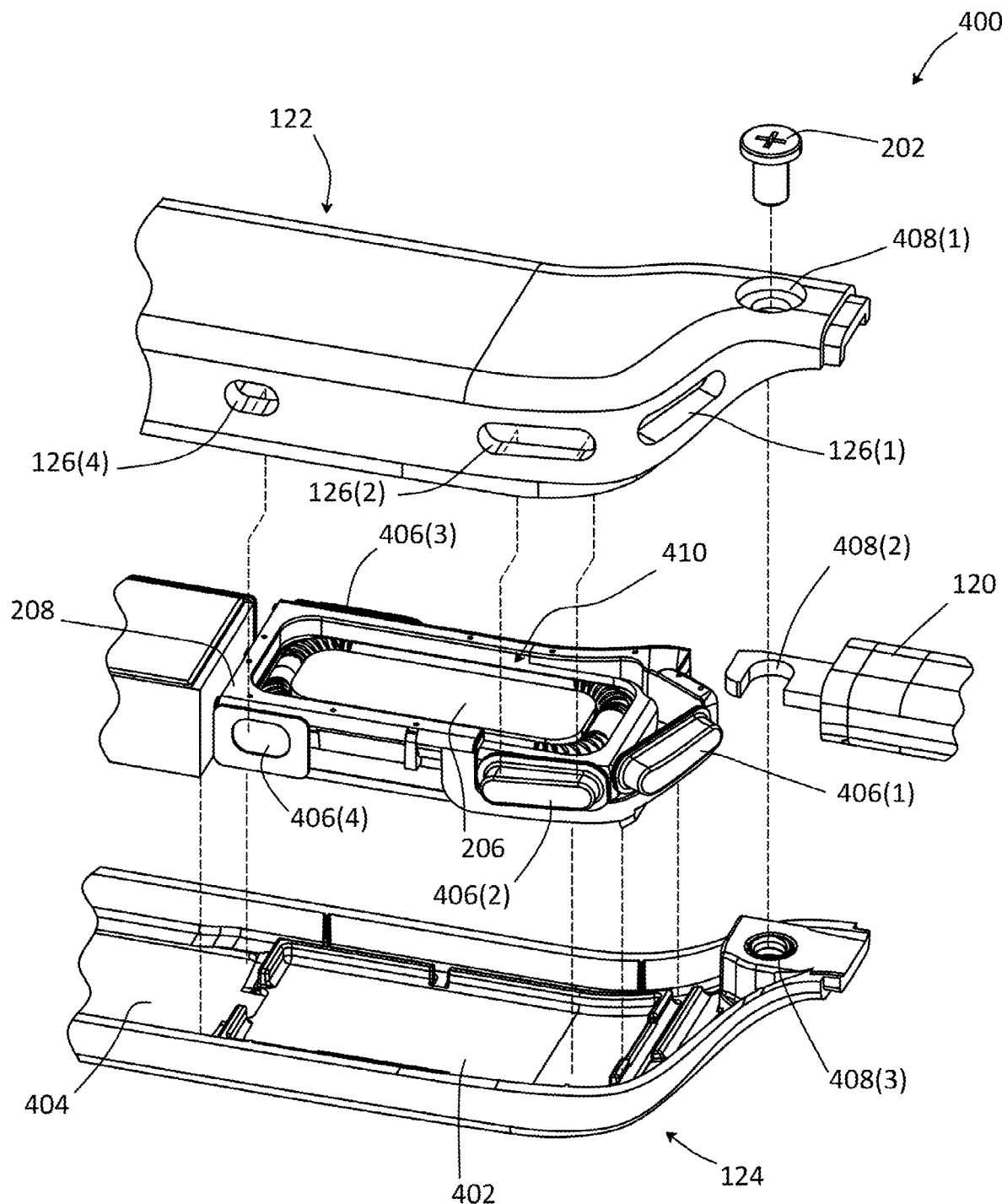
FIG. 4 is a diagram depicting a top exploded view of the portion of the first temple of the head-mounted wearable device (HMWD) of FIGS. 1A and 1B that is associated with the transducer.

FIG. 4 is a diagram 400 depicting a top exploded view of the portion of the first temple 110 of the head-mounted wearable device (HMWD) 102 of FIGS. 1A and 1B that is associated with the transducer. The first temple 110 may be assembled by placing the transducer body 206 and transducer bracket 208 within a first recess 402 within the outer housing 124. The inner housing 122 may include an additional recess that is complementary to the first recess 402, such that when the inner housing 122 is engaged with the outer housing 124, the first recess 402 and complementary recess form the first volume 204 that encloses the transducer. The transducer bracket 208 may maintain the transducer body 206 at a position relative to the interior wall of the first volume 204 and to the transducer openings 126. The transducer body 206 may separate the first volume 204 into a first portion 410 positioned on a first side of the transducer body 206, and a second portion 506 (shown in FIG. 5).

Other components of the HMWD 102 may also be placed in a second recess 404 within the outer housing 124. For example, other components may include a power storage device 212, circuitry for controlling one or more functions of the HMWD 102, capacitive sensors 214, and so forth. The inner housing 122 may include a recess that is complementary to the second recess 404 in the outer housing 124. When the inner housing 122 is engaged with the outer housing 124, the complementary recess and the second recess 404 may form the second volume 210, which may enclose the power storage device 212 and other components contained within the second volume 210. In some implementations, the first temple 110 may include one or more additional interior volumes, such as the third volume 216 shown in FIG. 2B, which may contain other components such as microphones and light sources.

As described previously, one or more of the inner housing 122 or the outer housing 124 may have transducer openings 126 formed therein to facilitate the passage of sound from the transducer from the first volume 204 to the environment external to the HMWD 102. For example, FIG. 4 depicts the first transducer opening 126(1) and the second transducer opening 126(2) formed in an underside of the inner housing 122. The first transducer opening 126(1) and second transducer opening 126(2) may enable movement of air between the first portion 410 of the first volume 204 and the exterior of the HMWD 102. FIG. 4 also depicts the fourth transducer opening 126(4) formed in an underside of the inner housing 122. The fourth transducer opening 126(4) may enable movement of air between the second portion 506 of the first volume 204 and the exterior of the HMWD 102. In other implementations, one or more of the transducer openings 126 may be formed in the outer housing 124. In still other implementations, each of the inner housing 122 and outer housing 124 may include a portion of the transducer openings 126 such that when the inner housing 122 is engaged to the outer housing 124, the transducer openings 126 communicating the first volume 204 with the environment external to the HMWD 102 are defined.

The transducer bracket 208 may include one or more acoustic covers 406 positioned at locations on the transducer bracket 208 that correspond to the locations of the transducer openings 126 in the inner housing 122 or other housing 124. The acoustic covers 406 may provide a material over the transducer openings 126 to prevent ingress of contaminants and other materials, and to provide acoustic characteristics to sound emitted by the transducer body 206 through the transducer openings 126 within the first temple 110. For example, the acoustic covers 406 may include an acoustic fabric or mesh material. FIG. 4 depicts a first acoustic cover 406(1) at a position on the transducer bracket 208 that corresponds to the position of the first transducer opening126(1) on the inner housing 122. Similarly, a second acoustic cover 406(2) is shown at a position on the transducer bracket 208 that corresponds to the position of the second transducer opening 126(2) on the inner housing 122. A fourth acoustic cover 406(4) is shown at a position on the transducer bracket 208 that corresponds to the position of the fourth transducer opening 126(4) on the inner housing 122. A third acoustic cover 406(3) may be positioned at a location on the transducer bracket 208 that corresponds to the position of the third transducer opening 126(3) (not visible in FIG. 4). When the transducer body 206 and transducer bracket 208 are positioned in the first recess 402 of the outer housing 124, and the inner housing 122 is engaged with the outer housing 124, each transducer opening 126 may be aligned with a respective acoustic cover 406 to enable sound emitted by the transducer to be communicated from the transducer, through the acoustic cover 406, to the environment external to the HMWD 102.

FIG. 4 also depicts a first receptacle 408(1) in the inner housing 122, a second receptacle 408(2) in the earpiece 120, and a third receptacle 408(3) in the outer housing 124. After the inner housing 122 is engaged to the outer housing 124 and a portion of the earpiece 120 is positioned between the inner housing 122 and the outer housing 124, the first receptacle 408(1), second receptacle 408(2), and third receptacle 408(3) may be aligned. Alignment of the receptacles 408 may enable a connector 202, such as a screw, rivet, peg, pin, or other type of fastener to pass through each of the receptacles 408 to engage the earpiece 120 to the temple body 118 of the first temple 110.

FIG. 4 depicts an implementation of components of the first temple 110 and a manner of engagement of the components. The second temple 112 may include identical or similar components that may be arranged and assembled in a manner similar to that described with regard to FIG. 4.

Figure 5:
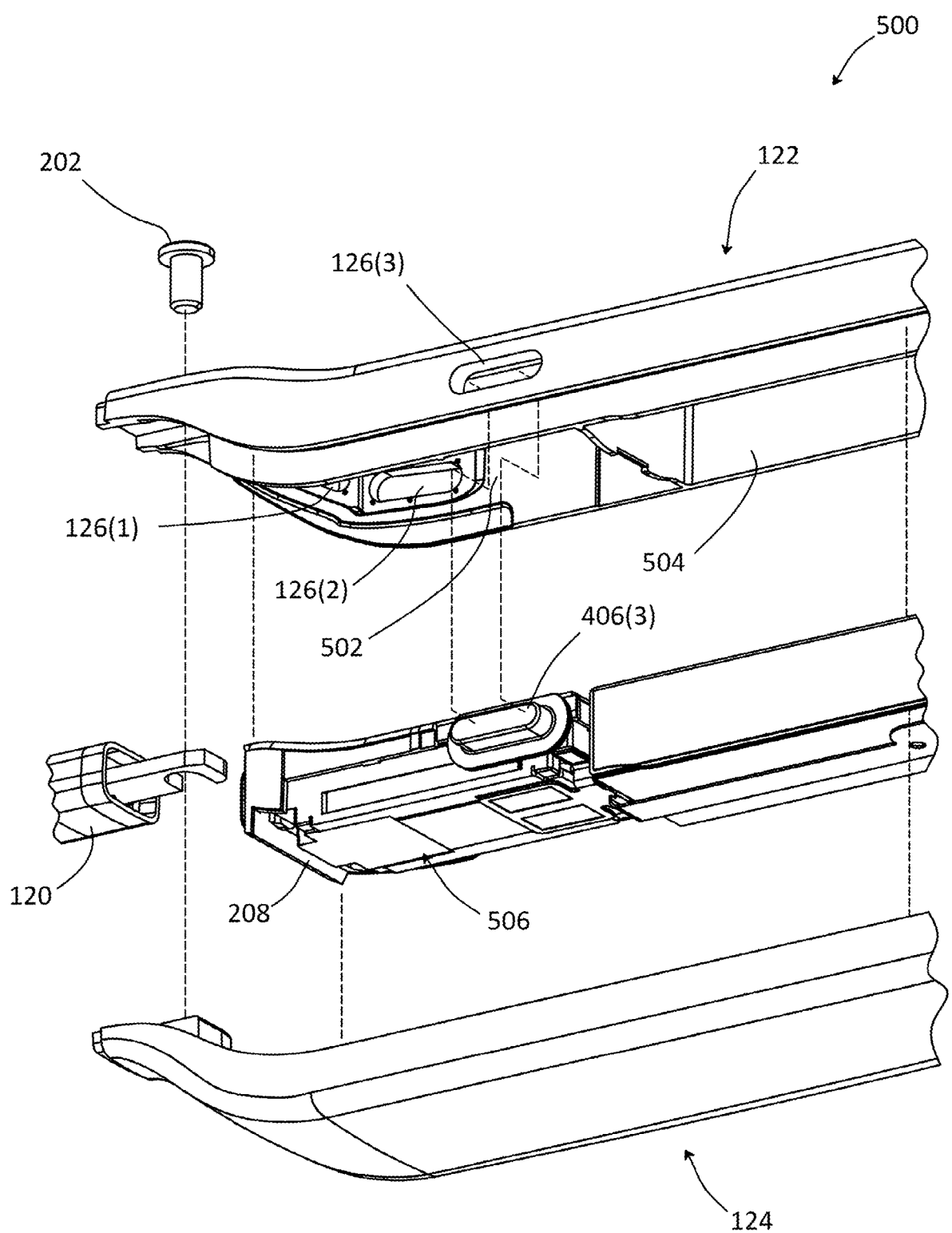
FIG. 5 is a diagram depicting a bottom exploded view of the portion of the first temple of the head-mounted wearable device (HMWD) shown in FIG. 4.

FIG. 5 is a diagram 500 depicting a bottom exploded view of the portion of the first temple 110 of the head-mounted wearable device (HMWD) 102 shown in FIG. 4. As described with regard to FIG. 4, a transducer may be placed within a recess in one or more of the inner housing 122 or outer housing 124, and when the inner housing 122 is engaged with the outer housing 124, the complementary recesses may form the first volume 204 that encloses the transducer. The transducer divides the first volume 204 into a first portion 410 (shown in FIG. 4) and a second portion 506. As shown in FIG. 5, the inner housing 122 may include a third recess 502 that is proximate to the receptacle 408(1) where the earpiece 120 may be attached to the first temple 110. When the transducer is placed in one of the third recess 502, or the first recess 402 in the outer housing 124, and the inner housing 122 is engaged to the outer housing 124, the first recess 402 and third recess 502 may abut to form the first volume 204 that encloses the transducer. The transducer bracket 208 may be used to position the transducer body 206 within the first volume 204, such as by spacing the transducer body 206 from one or more interior walls of the first volume 204. When the transducer bracket 208 is positioned in the inner housing 122, acoustic covers 406 of the transducer bracket 208 may align with corresponding transducer openings 126 in one of the inner housing 122 or outer housing 124. For example, a third acoustic cover 406(3) on the transducer bracket 208 is visible in FIG. 5. When the transducer bracket 208 is positioned in the third recess 502, the third acoustic cover 406(3) may align with the third transducer opening 126(3) to enable sound emitted using the transducer to pass through the acoustic cover 406(3) and transducer opening 126(3) into an environment external to the HMWD 102.

A fourth recess 504 may be adjacent to the third recess 502 in the inner housing 122. The fourth recess 504 may accommodate a power storage device 212, circuitry, capacitive sensor 214 and in some cases other components of the HMWD 102. When the inner housing 122 is engaged with the outer housing 124, the fourth recess 504 and the second recess 404 in the outer housing 124 may form the second volume 210, which may enclose the power storage device 212 and other components of the HMWD 102.

Figure 6:
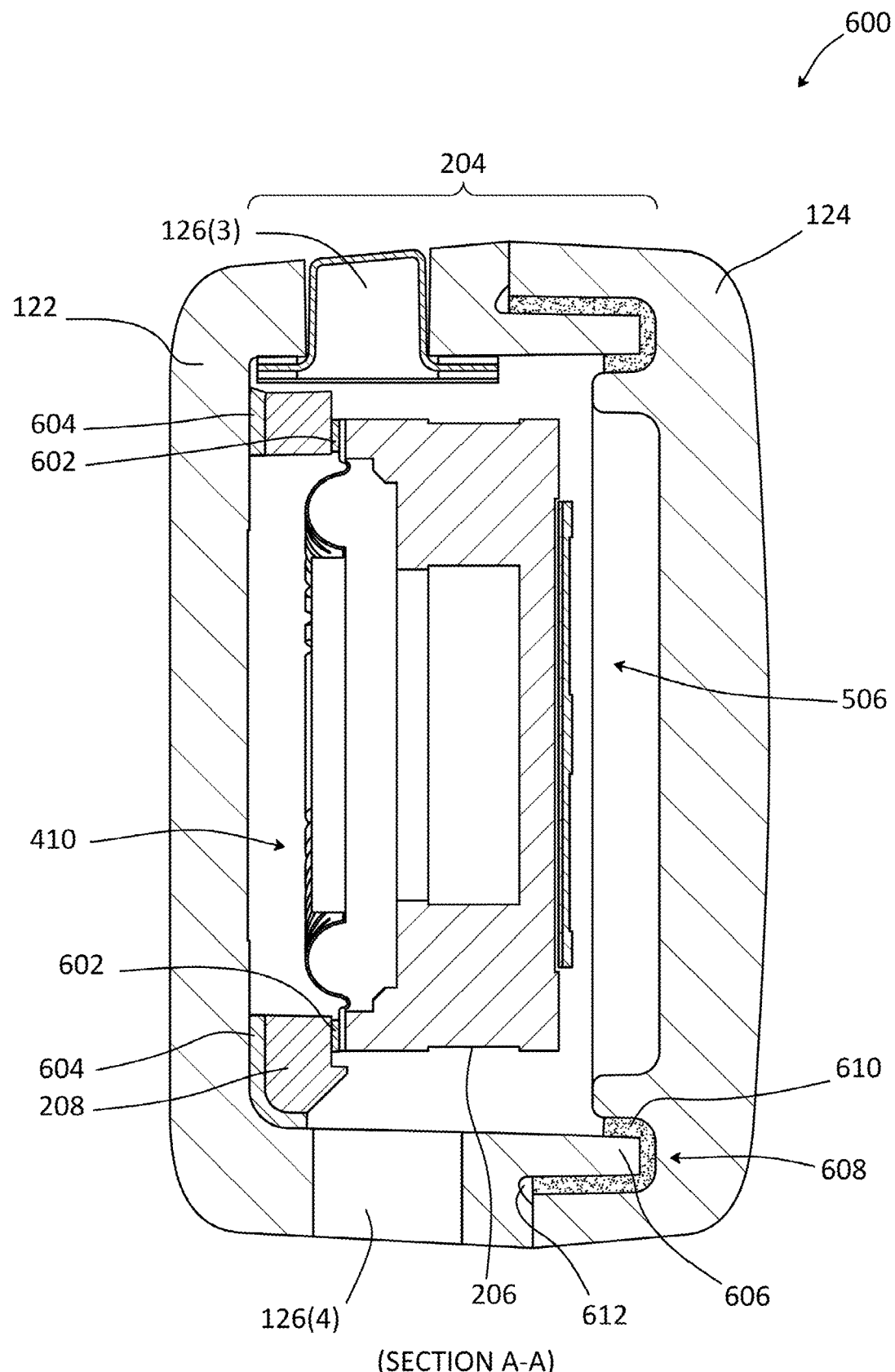
FIG. 6 is a diagram depicting a side cross-sectional view of the first temple of the head-mounted wearable device (HMWD) of FIG. 1A along Section Line A-A.

FIG. 6 is a diagram 600 depicting a side cross-sectional view of the first temple 110 of the head-mounted wearable device (HMWD) 102 of FIG. 1A along Section Line A-A. As described previously, the first temple 110 may include an inner housing 122 that is engaged with an outer housing 124. Engagement of the inner housing 122 to the outer housing 124 may define a first volume 204 within the first temple 110, which may contain a transducer. The transducer body 206 may divide the first volume 204 into a first portion 410 proximate to the inner housing 122 and a second portion 506 proximate to the outer housing 124. One or more transducer openings 126 in one or both of the inner housing 122 or outer housing 124, of which the third transducer opening 126(3) and fourth transducer opening 126(4) are visible in FIG. 6, may enable sound from the transducer to pass from the first volume 204 to an environment external to the first temple 110. The third transducer opening 126(3) and the fourth transducer opening 126(4) formed in the exterior wall of the first temple 110 enable the passage of air between the second portion 506 of the first volume 204 and the exterior of the HMWD 102. As described previously, the first transducer opening 126(1) (not visible in FIG. 6) and second transducer opening 126(2) (not visible in FIG. 6) enable passage of air between the exterior of the HMWD 102 and the first portion 410 of the first volume 204.

As shown in FIG. 6, a single layer of material, the exterior wall of the first temple 110, may be positioned between the transducer and the environment external to the first temple 110. For example, the transducer may not include a separate or additional housing. The exterior wall of the first temple 110 may instead function as the housing of the transducer. The transducer may include a transducer body 206, and a transducer bracket 208 that may be used to position the transducer body 206 within the first volume 204, such as by spacing the transducer body 206 from the interior wall of the first temple 110. For example, one or more transducer seals 602 may secure the transducer body 206 to the transducer bracket 208 to limit movement of the transducer body 206 and the transducer bracket 208 relative to one another. One or more bracket seals 604 may be used to secure the transducer bracket 208 to the interior wall of the first temple 110 to limit the movement of the transducer bracket 208 and transducer body 206 within the first volume 204. For example, FIG. 6 depicts bracket seals 604 between the interior surface of the inner housing 122 and the transducer bracket 208.

In some implementations, one or both of the inner housing 122 or outer housing 124 may include a protruding portion 606 to facilitate engagement between the inner housing 122 and outer housing 124. For example, FIG. 6 depicts the inner housing 122 having a protruding portion 606 that is positioned within a complementary recessed portion 608 of the outer housing 124. Continuing the example, a tongue-in-groove engagement may be used to reduce relative movement between the inner housing 122 and outer housing 124 during engagement. The area between the protruding portion 606 and recessed portion 608 may be at least partially filled with a sealant 610, such as glue, or another type of adhesive, bonding agent, seal, polymer, and so forth. In some implementations, the area between the protruding portion 606 and recessed portion 608 may include an additional space 612, which may function to contain excess sealant 610 material to provide a tolerance when constructing the HMWD 102. For example, if a larger quantity of glue or other material than the amount needed to secure the inner housing 122 to the outer housing 124 is provided, the excess material may enter the space 612 rather than entering the first volume 204 where damage to the transducer or other components may occur. After engaging the inner housing 122 with the outer housing 124 using the sealant 610, the first volume 204 within the first temple 110 may be pressurized using one or more gasses. Pressure values may be determined for at least two times, and a difference between the pressure values may be used to determine whether the pressure in the first volume 204 decreased over time, or whether the pressure in the first volume 204 remained constant within a threshold. If the pressure in the first volume 204 does not decrease significantly when the pressurized gas is applied, this indicates that the first housing 122 was successfully sealed with the second housing 124 in an airtight manner that facilitates use of the transducer.

Figure 7:
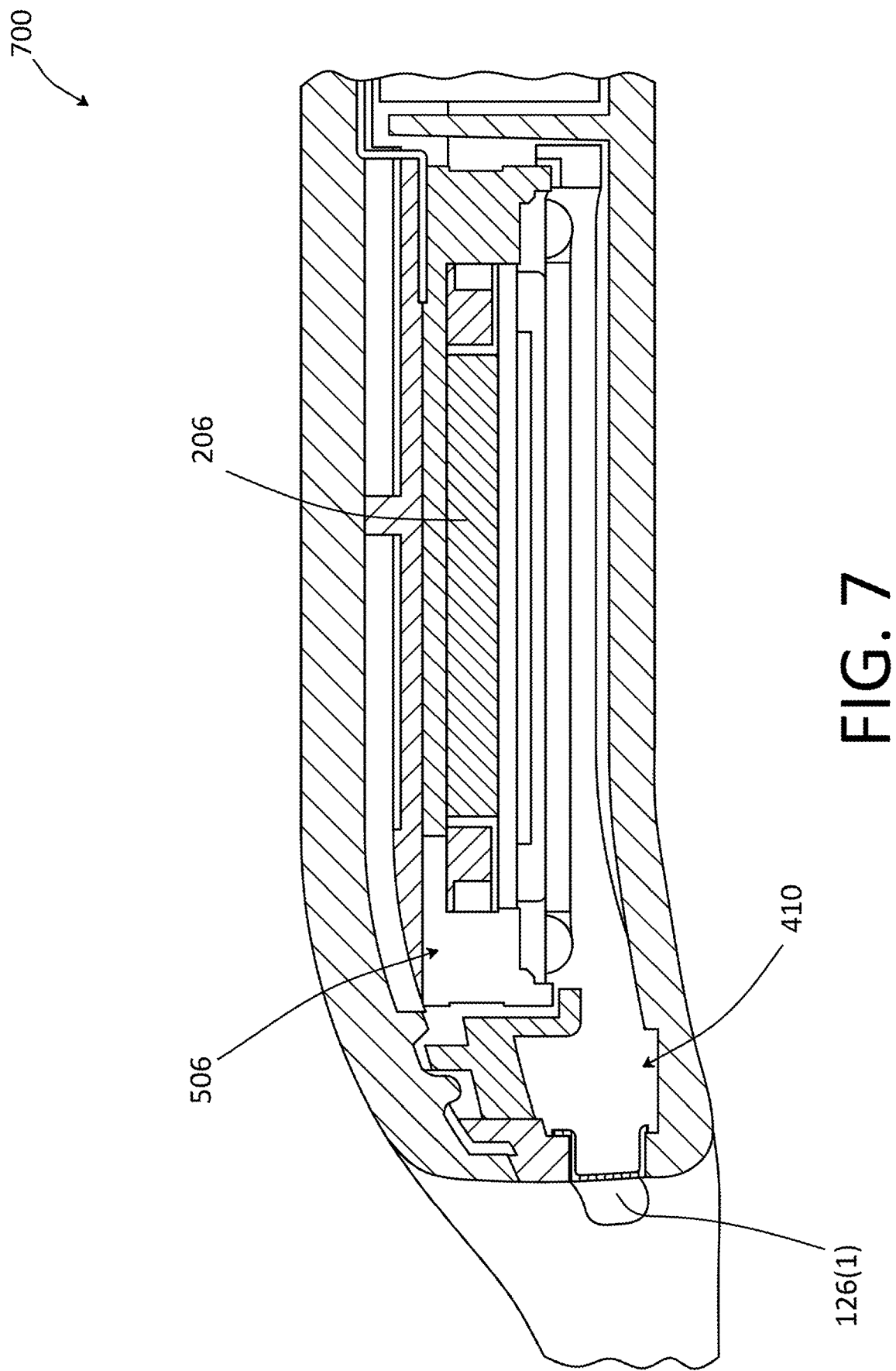
FIG. 7 depicts a cut-away view showing the position of a transducer within the first temple of the head-mounted wearable device (HMWD) of FIG. 1A, relative to transducer openings that enable passage of sound from the transducer to the exterior of the HMWD.

FIG. 7 depicts a cut-away view 700 showing the position of a transducer within the first temple 110 of the head-mounted wearable device (HMWD) 102 of FIG. 1A, relative to transducer openings 126 that enable passage of sound from the transducer to the exterior of the HMWD 102. The transducer body 206 may separate the first volume 204 within the first temple 110 into a first portion 410 positioned on a first side of the transducer body 206 and a second portion 506 positioned on an opposite side of the transducer body 206. The first transducer opening 126(1) and the second transducer opening 126(2) (not visible in FIG. 7) enable the passage of air, and thus sound, from the first portion 410 of the first volume 204 to the exterior of the HMWD 102.

Figure 8:
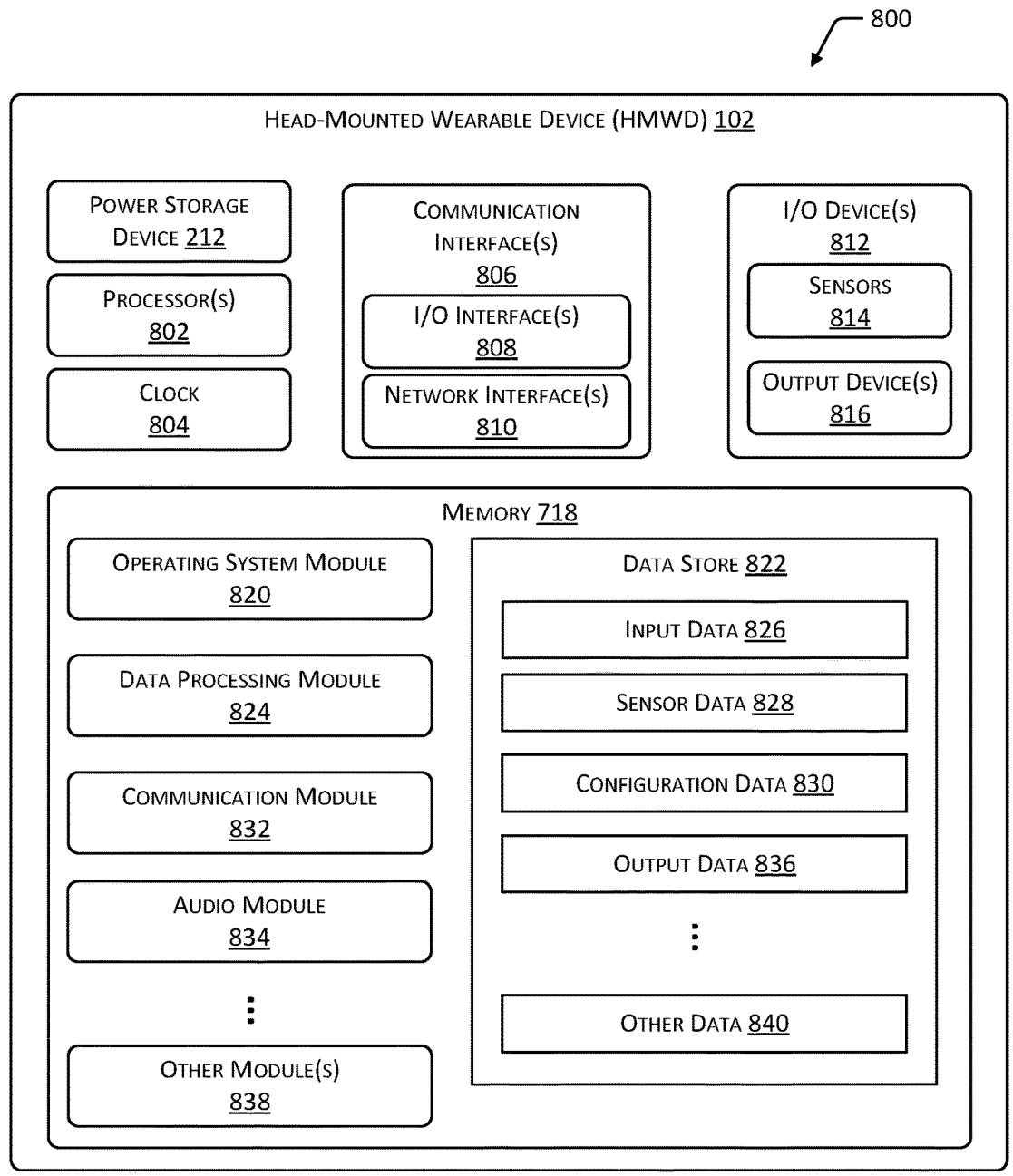
FIG. 8 is a block diagram depicting components of an implementation of a head-mounted wearable device (HMWD) within the present disclosure.

FIG. 8 is a block diagram 800 depicting components of an implementation of a head-mounted wearable device (HMWD) 102 within the present disclosure.

One or more power storage devices 212 may be configured to provide electrical power suitable for operating the components in the HMWD 102. For example, a power storage device 212 may include a rechargeable battery. In other implementations, other types of power supplies or power storage devices 212 may be used, such as capacitors, fuel cells, photovoltaic cells, wireless power receivers, conductive couplings suitable for attachment to an external power source such as provided by an electric utility, and so forth.

The HMWD 102 may include one or more hardware processors 802 configured to execute one or more stored instructions. The processors 802 may comprise one or more cores. The processors 802 may include general purpose microprocessors, microcontrollers, application specific integrated circuits (ASICs), digital signal processors (DSPs), and so forth. For example, one or more processors 802 may be associated with circuitry within one or more temples of the HMWD 102. One or more clocks 804 may provide information indicative of date, time, ticks, and so forth. For example, the processor 802 may use data from the clock 804 to associate a particular interaction with a particular point in time, trigger a preprogrammed action, and so forth.

The HMWD 102 may include one or more communication interfaces 806 such as input/output (I/O) interfaces 808, network interfaces 810, and so forth. The communication interfaces 806 enable the HMWD 102, or components thereof, to communicate with other devices or components. Additionally, in some implementations, each temple of the HMWD 102 may include a communication interface 806, which may be used to enable the temples to exchange data wirelessly, such that use of circuitry or conductors in the front frame 104 of the HMWD 102 is not necessary. The I/O interfaces 808 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 808 may couple to one or more I/O devices 812. The I/O devices 812 may include one or more types of sensors 814 that may function to receive input from a user or from an environment associated with the HMWD 102, and one or more types of output devices 816 that may be used to present data or a signal to a user.

The network interfaces 810 may be configured to provide communications between the HMWD 102 and other devices, such as one or more servers, computing devices, charging devices, and so forth. The network interfaces 810 may include devices configured to couple to personal area networks (PANs), wired or wireless local area networks (LANs), wide area networks (WANs), and so forth. For example, the network interfaces 810 may include devices compatible with Ethernet, Wi-Fi, Bluetooth, Bluetooth Low Energy, ZigBee, 5G, LTE, and so forth.

The HMWD 102 may also include one or more buses or other internal communications hardware or software that allow for the transfer of data between the various modules and components of the HMWD 102.

As shown in FIG. 8, the HMWD 102 may include one or more memories 818. The memory 818 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 818 provides storage of computer-readable instructions, data structures, program modules, and other data for the operation of the HMWD 102. A few examples of functional modules are shown stored in the memory 818, although the same functionality may alternatively be implemented in hardware, firmware, or as a system on a chip (SoC).

The memory 818 may include at least one operating system (OS) module 820. The OS module 820 is configured to manage hardware resource devices such as the I/O interfaces 808, the I/O devices 812, the communication interfaces 806, and provide various services to applications or modules executing on the processors 802. The OS module 820 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

Also stored in the memory 818 may be a data store 822 and one or more of the following modules. These modules may be executed as foreground applications, background tasks, daemons, and so forth. The data store 822 may use a flat file, database, linked list, tree, executable code, script, or other data structure to store information. In some implementations, the data store 822 or a portion of the data store 822 may be distributed across one or more other devices including servers, network attached storage devices, and so forth.

The memory 820 may store a data processing module 824. The data processing module 824 may receive input data 826 from input devices, sensor data 828 acquired using one or more sensors 814, and in some implementations, configuration data 830 that may include one or more thresholds or other settings, configurations, or preferences, to cause the HMWD 102 to perform various functions. For example, input data 826 may include actuation of one or more buttons 132 or other controls. Sensor data 828 may include receipt of voice commands or detection of ambient noise using one or more microphones, data indicative of light or objects acquired using one or more cameras, data indicative of movement or orientation acquired using one or more motion sensors, data indicative of a temperature of the HMWD 102 or of the ambient environment, and so forth. The HMWD 102 may include various applications, modules, or other computer-executable instructions that cause performance of functions based on acquired data, in some implementations based on configuration data 830.

The memory 818 may also store a communication module 832. The communication module 832 may be used to exchange data, signals, commands, and so forth with other computing devices. Communications may be authenticated, encrypted, and so forth. In some cases, the communication module 832 may be used to exchange data between memories 818 associated with each temple of the HMWD 102, such as if the front frame 104 of the HMWD 102 excludes electrical or computational components and no wired connection between the computing devices in the temples exists.

The memory 818 may additionally store an audio module 834. The audio module may cause one or more transducers associated with the HMWD 102 to emit sound having a variety of characteristics (e.g., amplitude, frequency, directionality). For example, in response to acquired input data 826, sensor data 828, or other types of data, output data 836 such as audio data may be determined, and the audio module 834 may be used to cause the output of sound based on the output data 836.

Other modules 838 may also be present in the memory 818 as well as other data 840 in the data store 822. For example, other modules 838 may include authorization and authentication modules used to acquire authorization from users for acquisition and processing of input data 826 and sensor data 828, authentication data to authenticate users and communications, and so forth. Other modules 838 may include interface modules for presenting visible or audio user interfaces, such as to change configurations or settings associated with the HMWD 102. Other data 840 may include encryption schema, various configurations and settings for the HMWD 102, user interface data that may be presented to users of the HMWD 102, and so forth.

Figure 9:
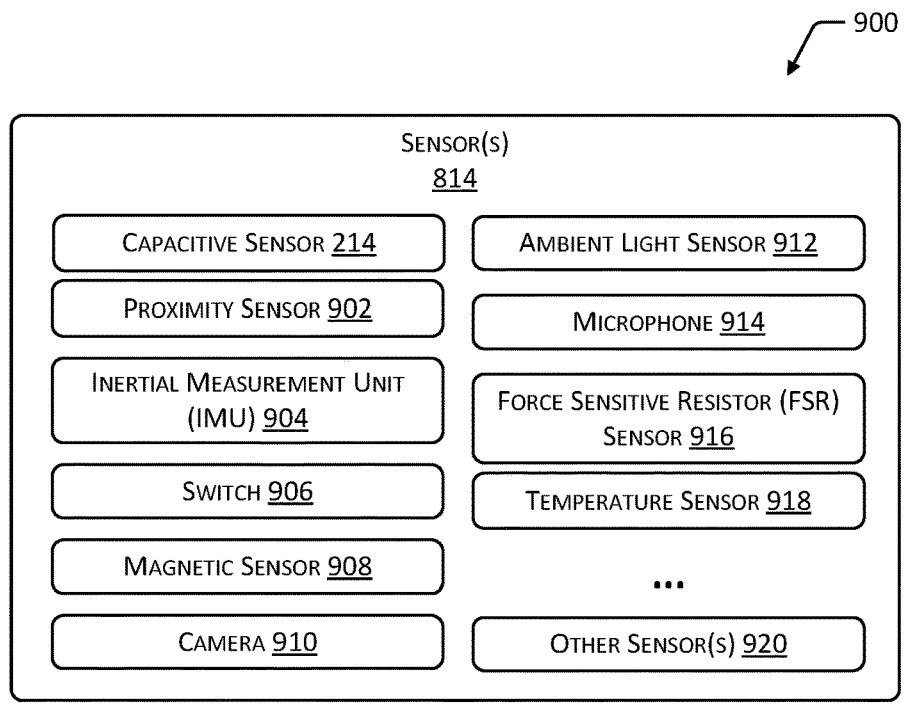
FIG. 9 is a block diagram that illustrates implementations of sensors and output devices of a head-mounted wearable device (HMWD) that may be used within the present disclosure.
Figure 9:
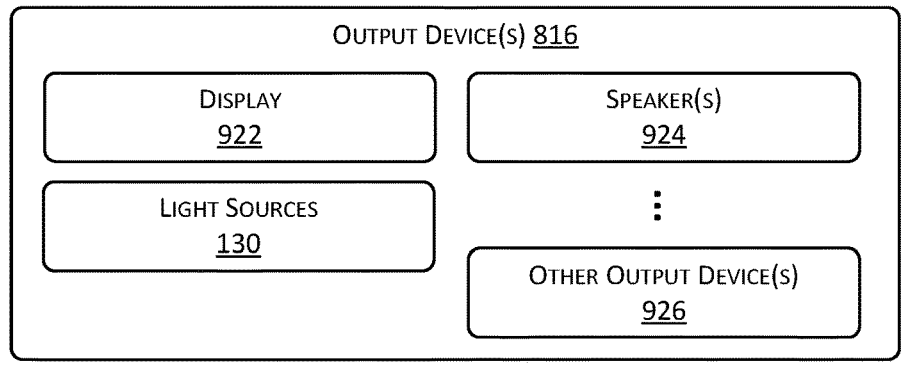

FIG. 9 is a block diagram 900 that illustrates implementations of sensors 814 and output devices 816 of a head-mounted wearable device (HMWD) 102 that may be used within the present disclosure.

As described with regard to FIG. 2, the HMWD 102 may include a capacitive sensor 214. For example, the capacitive sensor 214 may detect a touch input or gesture input provided by a user, contact indicative of the HMWD 102 being worn, and so forth. In some implementations, a capacitive sensor 214 may provide as output a one dimensional set of capacitance values.

In some cases, an HMWD 102 may include one or more proximity sensors 902. For example, proximity sensors 902 may include, without limitation, touch sensors, optical sensors, and so forth. Continuing the example, a touch sensor may provide output indicative of touch points as expressed along two dimensions. Proximity sensors 902 may be used to detect proximity of an object, such as the head of a user, which may be used to determine whether the HMWD 102 is worn. For example, the HMWD 102 may be configured to transition between an active state when worn and a low power state when not worn. Proximity sensors 902 may also detect engagement with a charging device, closeness of objects that may indicate a hazard responsive to which output may be presented, and so forth.

In some cases, the sensors 814 may include one or more Inertial Measurement Units (IMU) 904. For example, an IMU 904 may include one or more accelerometers, motion sensors, and so forth, which may detect movement, tilting, tipping over, falling or other types of motion, position, or orientation associated with the HMWD 102. For example, movement and orientation data may be used to determine one or more functions of the HMWD 102 that may be performed. Continuing the example, an IMU 904 may include a tilt sensor that provides sensor data indicative of an orientation of the HMWD 102 with respect to vertical. In other cases, an IMU 904 may include one or more gyrometers that provide data indicative of rotation of the HMWD 102 to indicate a change in orientation, accelerometers that provide data indicative of movement of the HMWD 102, and so forth.

The sensors 814 may include one or more switches 906. A switch 906 may include a mechanical or electronic switch, button, or other mechanism that is responsive to an external force, such as manual input. For example, a switch 906 may include a spring-biased switch that, when depressed, establishes an electric connection. Switches 906 may include mechanical switches, electronic switches, capacitive switches, and so forth.

In some implementations, the sensor(s) 814 may include a magnetic sensor 908, such as a magnetometer, magnetic reed switch, and so forth that provides information about magnetic fields. For example, a magnetometer may utilize a plurality of Hall effect sensors to detect the presence of the terrestrial magnetic field, magnetic field from a magnet, and so forth. In some cases, the magnetic sensor 908 may be used to determine the presence or absence of objects, which may be used to detect the presence of the body of a user, such as to determine whether the HMWD 102 is worn, the presence of a charging device to detect when the HMWD 102 is charging or inactive, and so forth.

The sensor(s) 814 may include one or more cameras 910. A camera 910 may be used to acquire image data. The camera 910 may also be configured to detect light in one or more wavelengths including, but not limited to, terahertz, infrared, visible, ultraviolet, and so forth. The camera 910 may comprise one or more charge coupled devices (CCD), complementary metal oxide semiconductor (CMOS) devices, microbolometers, and so forth. The HMWD 102 may use image data acquired by a camera 910 for object recognition, such as detection of particular objects, user communication, and so forth.

The sensor(s) 814 may include an ambient light sensor 912, which may include one or more of a photodetector, semiconductor junction, or other device that is sensitive to the presence or absence of light. The ambient light sensor 912 may provide information indicative of the level of illumination present at the location of the HMWD 102. For example, data from an ambient light sensor 912 may be used to control a quantity of light emitted by one or more light sources 130 associated with the HMWD 102. Ambient light sensors 912 may determine one or more of color, intensity, or duration of ambient lighting in an environment associated with the HMWD 102.

The sensor(s) 814 may include one or more microphones 914. In some implementations, each temple of the HMWD 102 may include two microphones 914, and audio data from both microphones 914 within a temple may be processed using a beamforming algorithm. In some implementations, a charge value for a power storage device 212 or a noise value associated with the microphone(s) 914 in each temple may be acquired, and one or more microphones 914 associated with a higher charge value or a lower noise value may be selected for use.

The sensors 814 may include a force sensitive resistor (or force sensing resistor) (FSR) sensor 916, which may include a material that changes in electrical resistance or conductivity responsive to an applied mechanical force. For example, an increase in force may result in a decrease in the electrical resistance measured across the material. In one implementation, the FSR sensor 916 may comprise a conductive polymer within which electrically conductive and nonconductive particles are suspended. The material to change electrical resistance may be arranged between a first electrode and a second electrode. Electrical circuitry may be used to determine electrical resistance between the first electrode and the second electrode. Data from an FSR sensor 916 may be used to operate the HMWD 102.

In some implementations, the HMWD 102 may include one or more temperature sensors 918. A temperature sensor 918 may provide data indicative of a temperature of one or more components of the HMWD 102. For example, a temperature sensor 918 may be associated with charging circuitry used to recharge a power storage device 212, and data from the temperature sensor 918 may be used to control a charging process for the power storage device 212 based on a relationship between a determined temperature and a threshold temperature. Temperature of components of the HMWD 102 may be used to control use of a processor 802 of the HMWD 102, deactivate the HMWD 102 to avoid damage, and so forth. In some implementations, a temperature sensor 918 may determine data indicative of a temperature of an ambient environment proximate to the HMWD 102. Additionally, in some implementations, the temperature sensor 918 may include an infrared temperature senor that may be used to determine the temperature of another object.

Other sensors 920 may also be present.

In some cases, output devices 816 associated with the HMWD 102 may include one or more displays 922. A display 922 may present images to a user of the HMWD 102. For example, a display 922 may include a liquid crystal display or light emitting diode display that manipulates rows and columns of picture elements to form an image. The display 922 may be emissive, reflective, or both. In some implementations, the display 922 may include image projectors. For example, an image projector may be configured to project an image onto a surface or object, such as one of the lenses 106 of the front frame 104.

The output devices 816 may include one or more light sources 130, or other types of visual indicators, that output visual indicia to convey information regarding the HMWD 102, such as whether the HMWD 102 is charging, whether microphones 914 or speakers 924 of the HMWD 102 are in use, and so forth.

The output devices 816 may additionally include one or more speakers 924, which may present audio that may be audible to individuals in an environment with the HMWD 102. For example, each temple of the HMWD 102 may include one or more transducers, which may function to output audio through ports in the body of the HMWD 102.

Other output devices 926 may also be used by the HMWD 102. For example, the HMWD 102 may include one or more haptic output devices, and so forth.

Those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A head-mounted wearable device comprising:
   a front frame;
   a first temple connected to the front frame, wherein the first temple includes a first exterior wall and a first internal volume;
   a first transducer within the first internal volume, wherein a first single layer of material that includes the first exterior wall separates the first transducer from an exterior of the head-mounted wearable device, and wherein the first transducer separates the first internal volume into a first portion on a first side of the first transducer and a second portion on a second side of the first transducer;
   a first opening in the first single layer of material that permits passage of air between the first portion of the first internal volume and the exterior of the head-mounted wearable device;

a second opening in the first single layer of material that permits passage of air between the second portion of the first internal volume and the exterior of the head-mounted wearable device;

a third opening in the first single layer of material that permits passage of air between the second portion of the first internal volume and the exterior of the head-mounted wearable device;

a fourth opening extending through the first single layer of material, wherein the fourth opening permits passage of air between the first portion of the first internal volume and the exterior of the head-mounted wearable device;

a first layer of acoustic material positioned between the first opening and the exterior, wherein the first layer has a first thickness;

a second layer of acoustic material positioned between the second opening and the exterior, wherein the second layer has the first thickness;

a third layer of acoustic material positioned between the third opening and the exterior, wherein the third layer has the first thickness; and a fourth layer of acoustic material positioned between the fourth opening and the exterior, wherein the fourth layer has the first thickness.

2. The head-mounted wearable device of claim 1, further comprising:
a first communication interface in the first temple;
a second temple connected to the front frame, wherein the second temple includes a second exterior wall and a second internal volume;
a second transducer within the second internal volume, wherein a second single layer of material that includes the second exterior wall separates the second transducer from the exterior and wherein the second transducer separates the second internal volume into a third portion on a third side of the second transducer and a fourth portion on a fourth side of the second transducer;
a fifth opening in the second single layer of material that permits passage of air between the third portion of the second internal volume and the exterior of the head-mounted wearable device;
a sixth opening in the second single layer of material that permits passage of air between the fourth portion of the second internal volume and the exterior of the head-mounted wearable device; and
a second communication interface in the second temple.

3. The head-mounted wearable device of claim 1, further comprising:
a second temple connected to the front frame, wherein the second temple includes a second exterior wall and a second internal volume;
a first microphone in the first temple;
a second microphone in the second temple;
a first power storage device in the first temple;
a second power storage device in the second temple;
one or more non-transitory memories storing computer-executable instructions; and
one or more hardware processors configured to execute the computer-executable instructions to:
determine a first charge value associated with the first power storage device;
determine a second charge value associated with the second power storage device;
determine that the first charge value is greater than the second charge value; and
in response to the first charge value being greater than the second charge value, acquire audio data using the first microphone.

4. The head-mounted wearable device of claim 1, further comprising:
a second temple connected to the front frame, wherein the second temple includes a second exterior wall and a second internal volume;
a first microphone in the first temple;
a second microphone in the second temple;
one or more non-transitory memories storing computer-executable instructions; and
one or more hardware processors configured to execute the computer-executable instructions to:
acquire first audio data using the first microphone;
determine a first noise value based on the first audio data;
acquire second audio data using the second microphone;
determine a second noise value based on the second audio data;
determine that the first noise value is less than the second noise value; and
in response to the first noise value being less than the second noise value, acquire audio data using the first microphone.

5. The head-mounted wearable device of claim 1, wherein the first temple includes an inner side and an outer side, the head-mounted wearable device further comprising:
a first microphone positioned on the inner side of the first temple at a first position that is proximate to the front frame;
a second microphone positioned on the inner side of the first temple at a second position that is proximate to the front frame;
one or more non-transitory memories storing computer-executable instructions; and
one or more hardware processors configured to execute the computer-executable instructions to:
acquire first audio data using the first microphone;
acquire second audio data using the second microphone; and
process the first audio data and the second audio data to determine third audio data.

6. The head-mounted wearable device of claim 1, further comprising:
one or more non-transitory memories storing computer-executable instructions; and
one or more hardware processors configured to execute the computer-executable instructions to:
provide a first signal to the first transducer to cause the first transducer to emit sound through the first opening and the second opening.

7. The head-mounted wearable device of claim 1, wherein the fourth opening is spaced from the first opening.

8. The head-mounted wearable device of claim 1, further comprising:
a curved portion in a lower side of the first temple, wherein the first opening is formed in a first side of the curved portion and the fourth opening is formed in a second side of the curved portion, and wherein the fourth opening is spaced from the first opening.

9. The head-mounted wearable device of claim 1, further comprising:
a hinge that connects the front frame to a first end of the first temple; and
an earpiece connected to a second end of the first temple;

wherein:
  a lower side of the first temple includes a curved portion proximate to the earpiece; and
  the first opening is formed in the curved portion.

10. The head-mounted wearable device of claim 1, wherein the third opening is positioned on a lower side of the first temple and the second opening is positioned on an upper side of the first temple opposite the lower side.

11. The head-mounted wearable device of claim 1, wherein the first temple includes an inner side and an outer side, the first temple further comprising:
  a light source in the first temple and positioned to emit light at least partially toward the inner side.

12. A head-mounted wearable device comprising:
  a front frame;
  a first temple connected to the front frame, wherein the first temple includes:
    a first portion of a housing that includes a protruding portion;
    a second portion of the housing that includes a recessed portion, wherein the protruding portion is positioned in the recessed portion; and
    a sealant positioned in a space between the protruding portion and the recessed portion;
  a first transducer within a first internal volume of the first temple, wherein a first portion of the first internal volume is on a first side of the first transducer and a second portion of the first internal volume is on a second side of the first transducer;
  a first opening in an exterior wall of the first temple, wherein the first opening permits passage of air between an exterior of the first temple and the first portion of the first internal volume; and
  a second opening in the exterior wall of the first temple, wherein the second opening permits passage of air between the exterior of the first temple and the second portion of the first internal volume.

13. The head-mounted wearable device of claim 12, wherein a single layer of material that includes the exterior wall of the first temple separates the first transducer from the exterior of the first temple, and the first opening and the second opening extend through the single layer of material.

14. The head-mounted wearable device of claim 12, wherein the sealant provides an airtight seal between the first internal volume and a second internal volume in the first temple.

15. The head-mounted wearable device of claim 12, wherein:
  the first transducer comprises a transducer body and a transducer bracket;
  the transducer bracket is positioned between the transducer body and the exterior wall of the first temple; and
  the transducer bracket secures the transducer body in a position relative to the exterior wall of the first temple.

16. A head-mounted wearable device comprising:
  a front frame;
  a first temple connected to the front frame, wherein the first temple includes a curved portion;
  a first transducer within a first internal volume of the first temple, wherein a first portion of the first internal volume is on a first side of the first transducer and a second portion of the first internal volume is on a second side of the first transducer;
  a first opening in an exterior wall of the first temple on a first side of the curved portion, wherein the first opening permits passage of air between an exterior of the first temple and the first portion of the first internal volume;
  a second opening in the exterior wall of the first temple, wherein the second opening permits passage of air between the exterior of the first temple and the second portion of the first internal volume; and
  a third opening in the exterior wall of the first temple on a second side of the curved portion, wherein the third opening permits passage of air between the exterior of the first temple and the first portion of the first internal volume.

17. A head-mounted wearable device comprising:
  a front frame;
  a first temple connected to the front frame;
  a first transducer within a first internal volume of the first temple, wherein a first portion of the first internal volume is on a first side of the first transducer and a second portion of the first internal volume is on a second side of the first transducer;
  a first opening in a first exterior wall of the first temple, wherein the first opening permits passage of air between an exterior of the first temple and the first portion of the first internal volume;
  a second opening in the first exterior wall of the first temple, wherein the second opening permits passage of air between the exterior of the first temple and the second portion of the first internal volume;
  a second temple connected to the front frame, wherein the second temple includes a second exterior wall and a second internal volume;
  a first microphone in the first temple;
  a second microphone in the second temple;
  a first power storage device associated with the first temple;
  a second power storage device associated with the second temple;
  one or more non-transitory memories storing computer-executable instructions; and
  one or more hardware processors configured to execute the computer-executable instructions to:
    determine a first charge value associated with the first power storage device;
    determine a second charge value associated with the second power storage device;
    determine that the first charge value is greater than the second charge value; and
    in response to the first charge value being greater than the second charge value, acquire audio data using the first microphone.

18. A head-mounted wearable device comprising:
  a front frame;
  a first temple connected to the front frame;
  a first transducer within a first internal volume of the first temple, wherein a first portion of the first internal volume is on a first side of the first transducer and a second portion of the first internal volume is on a second side of the first transducer;
  a first opening in a first exterior wall of the first temple, wherein the first opening permits passage of air between an exterior of the first temple and the first portion of the first internal volume;
  a second opening in the first exterior wall of the first temple, wherein the second opening permits passage of air between the exterior of the first temple and the second portion of the first internal volume;

a second temple connected to the front frame, wherein the second temple includes a second exterior wall and a second internal volume;
a first microphone in the first temple;
a second microphone in the second temple;
one or more non-transitory memories storing computer-executable instructions; and
one or more hardware processors configured to execute the computer-executable instructions to:
  acquire first audio data using the first microphone;
  determine a first noise value based on the first audio data;
  acquire second audio data using the second microphone;
  determine a second noise value based on the second audio data;
  determine that the first noise value is less than the second noise value; and
  in response to the first noise value being less than the second noise value, acquire third audio data using the first microphone.

19. A head-mounted wearable device comprising:
a front frame;
a first temple connected to the front frame;
a first transducer within a first internal volume of the first temple, wherein a first portion of the first internal volume is on a first side of the first transducer and a second portion of the first internal volume is on a second side of the first transducer;
a first opening in an exterior wall of the first temple, wherein the first opening permits passage of air between an exterior of the first temple and the first portion of the first internal volume;
a second opening in the exterior wall of the first temple, wherein the second opening permits passage of air between the exterior of the first temple and the second portion of the first internal volume;
a third opening in the exterior wall of the first temple, wherein the third opening permits passage of air between the exterior and one of the first portion of the first internal volume or the second portion of the first internal volume and the exterior;
a first layer of acoustic material positioned between the first opening and the exterior, wherein the first layer has a first thickness;
a second layer of acoustic material positioned between the second opening and the exterior, wherein the second layer has the first thickness; and
a third layer of acoustic material positioned between the third opening and the exterior, wherein the third layer has the first thickness.

20. The head-mounted wearable device of claim 19, wherein the third opening permits passage of air between the first portion of the first internal volume and the exterior.

21. The head-mounted wearable device of claim 20, further comprising:
a fourth opening in the exterior wall of the first temple, wherein the fourth opening permits passage of air between the second portion of the first internal volume and the exterior; and
a fourth layer of acoustic material positioned between the fourth opening and the exterior, wherein the fourth layer has the first thickness.

22. The head-mounted wearable device of claim 19, wherein the third opening permits passage of air between the second portion of the first internal volume and the exterior.

23. The head-mounted wearable device of claim 19, further comprising:
a curved portion on a lower side of the first temple, wherein the first opening is formed on a first side of the curved portion and the third opening is formed on a second side of the curved portion.

* * * * *